US012595344B2

(12) United States Patent
Welch, III et al.

(10) Patent No.: US 12,595,344 B2
(45) Date of Patent: Apr. 7, 2026

(54) LIQUID CRYSTAL POLYMER COMPOSITE, LIQUID CRYSTAL POLYMER COMPOSITE FILM, AND METAL-CLAD LAMINATE INCLUDING SAME

(71) Applicant: Textiles Coated, Incorporated, Londonderry, NH (US)

(72) Inventors: John Henry Welch, III, Lowell, MA (US); Kwong Yiu Hau, Windham, NH (US)

(73) Assignee: TEXTILES COATED, INCORPORATED, Londonderry, NH (US)

( * ) Notice: Subject to any disclaimer, the term of this patent is extended or adjusted under 35 U.S.C. 154(b) by 0 days.

(21) Appl. No.: 17/558,110

(22) Filed: Dec. 21, 2021

(65) Prior Publication Data

US 2022/0380558 A1 Dec. 1, 2022

Related U.S. Application Data

(60) Provisional application No. 63/128,564, filed on Dec. 21, 2020, provisional application No. 63/165,480, filed on Mar. 24, 2021.

(51) Int. Cl.
*C08J 5/18* (2006.01)
*B29C 48/00* (2019.01)
(Continued)

(52) U.S. Cl.
CPC ............. *C08J 5/18* (2013.01); *B29C 48/0011* (2019.02); *B32B 15/08* (2013.01); *B32B 15/20* (2013.01);
(Continued)

(58) Field of Classification Search
CPC ......... B32B 15/08; B32B 15/20; B32B 27/20; B32B 2250/40; B29C 48/0011;
(Continued)

(56) References Cited

U.S. PATENT DOCUMENTS 6,027,771 A 2/2000 Moriya
6,649,083 B1 * 11/2003 Pinnavaia ................ B01J 20/00
502/158

(Continued)

FOREIGN PATENT DOCUMENTS

CN 108712962 A 10/2018
EP 2719799 A1 4/2014

(Continued)

OTHER PUBLICATIONS

International Preliminary Report on Patentability in Application No. PCT/US2021/064627 dated Jun. 29, 2023, 7 pages.

(Continued)

*Primary Examiner* — Maria V Ewald
*Assistant Examiner* — Ethan Weydemeyer
(74) *Attorney, Agent, or Firm* — Gesmer Updegrove LLP

(57) ABSTRACT

A liquid crystal polymer composite film is formed from a resin composite including one or more liquid crystal polymers and one or more fillers. The liquid crystal polymer composite film has a thickness in the range of 10 μm-200 μm and a ratio of the in-plane dielectric permittivity in the machine direction to the transverse direction in the range of 1.0-1.4 over a frequency range of 1 Ghz to 10 Ghz. A metal-clad laminate includes the liquid crystal polymer composite film and a metal clad layer laminated to a major surface of the liquid crystal polymer composite film. The metal-clad laminate may be included as part of an antenna.

18 Claims, 5 Drawing Sheets

(51) Int. Cl.

| | |
|---|---|
| ***B32B 15/08*** | (2006.01) |
| ***B32B 15/20*** | (2006.01) |
| ***B32B 27/20*** | (2006.01) |
| ***C08K 3/36*** | (2006.01) |
| *B29K 105/00* | (2006.01) |
| *B29K 705/00* | (2006.01) |
| *C08K 3/34* | (2006.01) |

(52) U.S. Cl.

CPC ................ *B32B 27/20* (2013.01); *C08K 3/36* (2013.01); *B29K 2105/0079* (2013.01); *B29K 2705/00* (2013.01); *B32B 2250/40* (2013.01); *B32B 2307/204* (2013.01); *B32B 2307/30* (2013.01); *B32B 2307/538* (2013.01); *B32B 2307/54* (2013.01); *B32B 2307/546* (2013.01); *B32B 2307/732* (2013.01); *B32B 2307/748* (2013.01); *B32B 2311/12* (2013.01); *B32B 2457/00* (2013.01); *C08J 2367/04* (2013.01); *C08K 2003/343* (2013.01)

(58) Field of Classification Search

CPC ......... B29K 2105/0079; B29K 2705/00; C08J 5/18; C08K 3/36

See application file for complete search history.

(56) References Cited

U.S. PATENT DOCUMENTS

| | | | |
|---|---|---|---|
| 6,994,896 | B2 | 2/2006 | Sethumadhavan et al. |
| 2004/0124405 | A1* | 7/2004 | Sethumadhavan ... B32B 27/365 257/1 |
| 2017/0283586 | A1* | 10/2017 | Tsuchiya ............ C09K 19/3809 |

FOREIGN PATENT DOCUMENTS

| | | | |
|---|---|---|---|
| JP | H1034742 | A | 2/1998 |
| JP | 2014111699 | A | 6/2014 |
| JP | 2018109090 | A | 7/2018 |
| WO | 2017154811 | A1 | 9/2017 |

OTHER PUBLICATIONS

Tilve-Martinez et al., "Electrical Anisotropy and its Mitigation in Conductive Polymers Printed by Digital Light Processing," ChemRxiv, pp. 1-18, 2023.

Notification of Reasons for Rejection, along with its English translation, issued by the Japanese Patent Office in related Japanese Patent Application No. JP2023-537499 on Sep. 3, 2024, 8 pages.

* cited by examiner

LIQUID CRYSTAL POLYMER COMPOSITE, LIQUID CRYSTAL POLYMER COMPOSITE FILM, AND METAL-CLAD LAMINATE INCLUDING SAME

CROSS-REFERENCE TO RELATED APPLICATIONS

This is a U.S. Utility application which claims the benefit of U.S. Provisional Application No. 63/128,564, filed on Dec. 21, 2020 and U.S. Provisional Application No. 63/165,480, filed on Mar. 24, 2021, the disclosures of both of which are incorporated herein by reference in their entireties.

TECHNICAL FIELD

The invention relates to liquid crystal polymer composites, and in particular to liquid crystal polymer composite films that may be included in a metal-clad laminate. The metal-clad laminate may be used, for example, in telecommunication products such as an antenna assembly, or in multilayer applications such as multilayer circuit boards, as multilayer stack-up in a rigid multilayer circuit, a multilayer stack in a flexible PCB, or as a single layer in a “hybrid” structure.

BACKGROUND

The high frequency market is continuing to expand. For example, the 5G telecommunication standard provides a network that can use frequencies up to 40 GHz, while a mmWave radar for autonomous driving operate even higher at 70 GHz. Devices such as mobile handsets, tablets, laptops, vehicles, and other devices include antenna substrate assemblies in order to utilize the 5G network. These antenna assemblies may include an electrically conductive, flexible or rigid substrate on which the antenna material is applied (e.g., a copper clad laminate). But there can be issues in providing an antenna substrate having electrical properties and physical/mechanical properties suitable for use in high frequency applications.

SUMMARY OF INVENTION

The present disclosure relates to a liquid crystal polymer (“LCP”) composite that can be processed into a film. This LCP composite film may be used as part of a metal-clad laminate substrate, and may be suitable for use in high frequency products such as an antenna assembly or automotive radar. The LCP composite film produced from the LCP composite may have low in-plane dielectric permittivity and low loss tangent for high frequency applications. The film produced from the LCP composite may also in some embodiments have low anisotropy with respect to one or more of these properties.

The invention relates to the following limitations, options and embodiments which may be included solely or in combination.

A liquid crystal polymer composite film formed from a resin composite, the resin composite comprising one or more liquid crystal polymers present in an amount in the range of 40 wt % to 95 wt % based on a total weight of the liquid crystal polymer composite; and one or more fillers present in an amount in the range of 5 wt % to 60 wt % based on the total weight of the liquid crystal polymer composite, wherein a thickness of the liquid crystal polymer composite film is in the range of 10 μm-200 μm, and wherein a ratio of an in-plane dielectric permittivity in a machine direction of the liquid crystal polymer composite film to an in-plane dielectric permittivity in a transverse direction the liquid crystal polymer composite film is in the range of 1.0-1.4 over a frequency range of 1 GHz to 10 GHz.

The liquid crystal polymer composite film, wherein a ratio of a loss tangent in the machine direction of the liquid crystal polymer composite film to a loss tangent in the transverse direction of the liquid crystal polymer composite film is in the range of 0.2-1.0 over a frequency range of 1 GHz to 10 GHz.

The liquid crystal polymer composite film, wherein the one or more liquid crystal polymers comprises a polymer including monomer units derived from 4-hydroxybenzoic acid and 6-hydroxy-2-naphthoic acid.

The liquid crystal polymer composite film, wherein the one or more liquid crystal polymers comprises a polymer including monomer units derived from 4-hydroxybenzoic acid.

The liquid crystal polymer composite film, wherein the one or more fillers comprises one or more of zeolite, fused silica, or talc.

The liquid crystal polymer composite film, wherein the melt viscosity of the resin composite at a melt temperature of 320 C and at a shear rate of 1800 (1/s) is at least 30 Pa-s and under 120 Pa-s.

The liquid crystal polymer composite film, wherein the melt viscosity of the resin composite at a melt temperature of 320 C and at a shear rate of 1800 (1/s) is at least 36 Pa-s and under 80 Pa-s, wherein the thickness of the liquid crystal polymer composite film is in the range of 10 μm-100 μm.

The liquid crystal polymer composite film, wherein the melt viscosity of the resin composite at a melt temperature of 320 C and at a shear rate of 1800 (1/s) is at least 36 Pa-s and under 57 Pa-s, wherein the thickness of the liquid crystal polymer composite film is in the range of 10 μm-100 μm.

The liquid crystal polymer composite film, wherein the thickness of the liquid crystal polymer composite film is in the range of 25 μm-200 μm.

A metal-clad laminate, comprising: the liquid crystal polymer composite film; and a metal layer laminated to a major surface of the liquid crystal polymer composite film, wherein the ratio of the in-plane dielectric permittivity in the machine direction of the liquid crystal polymer composite film to the dielectric permittivity in the transverse direction of the liquid crystal polymer composite film is in the range of 0.9-1.2 over a frequency range of 1 GHz to 10 GHz.

The metal-clad laminate wherein the ratio of the in-plane dielectric permittivity in the machine direction of the liquid crystal polymer composite film to the dielectric permittivity in the transverse direction of the liquid crystal polymer composite film is in the range of 0.9-1.1 over a frequency range of 1 GHz to 10 GHz.

The metal-clad laminate, wherein the ratio of the in-plane dielectric permittivity in the machine direction of the liquid crystal polymer composite film to the dielectric permittivity in the transverse direction of the liquid crystal polymer composite film provided in the metal-clad laminate is less than the ratio of the in-plane dielectric permittivity in the machine direction of the liquid crystal polymer composite film to the dielectric permittivity in the transverse direction of the liquid crystal polymer composite film prior to lamination.

The metal-clad laminate, wherein the metal is copper and the roughness of the copper surface is less than 5 microns as measured by Rz Ten point mean roughness.

The metal-clad laminate, wherein a peel strength of the copper from the LCP composite film is in the range of 6.0 to 13.0 lb/in width.

The metal-clad laminate, wherein the metal is copper and the roughness of the copper surface is less than or equal to 3 microns as measured by Rz Ten point mean roughness.

The metal-clad laminate, wherein a peel strength of the MHT copper from the LCP composite film is in the range of 4.0 to 10.0 lb/in width.

The metal-clad laminate, further comprising an additional metal-clad layer laminated to an additional major surface of the liquid crystal polymer composite film.

The metal-clad laminate, wherein a ratio of a coefficient of thermal expansion of the liquid crystal polymer composite film in the machine direction relative to the transverse direction (MD/TD) is in the range of 0.9 to 1.0.

The metal-clad laminate, wherein the thickness of the laminate is in the range of 15 μm-50 μm, and wherein the laminate is flexible.

The metal-clad laminate, wherein the thickness of the laminate is in the range of 50 μm-200 μm, and wherein the laminate is rigid.

A metal-clad laminate, comprising: the liquid crystal polymer composite film; and a metal layer laminated to a major surface of the liquid crystal polymer composite film, wherein the composite film has a relative permittivity less than 3.1.

An antenna, comprising the metal-clad laminate.

A substrate, comprising the metal-clad laminate.

The metal-clad laminate, further comprising a third layer, wherein the layer comprises a material selected from a group comprising FR4, PTFE, Polyimide, and combinations thereof.

The foregoing and other features of the invention are hereinafter described in greater detail with reference to the accompanying drawings.

DESCRIPTION

Figure 1:
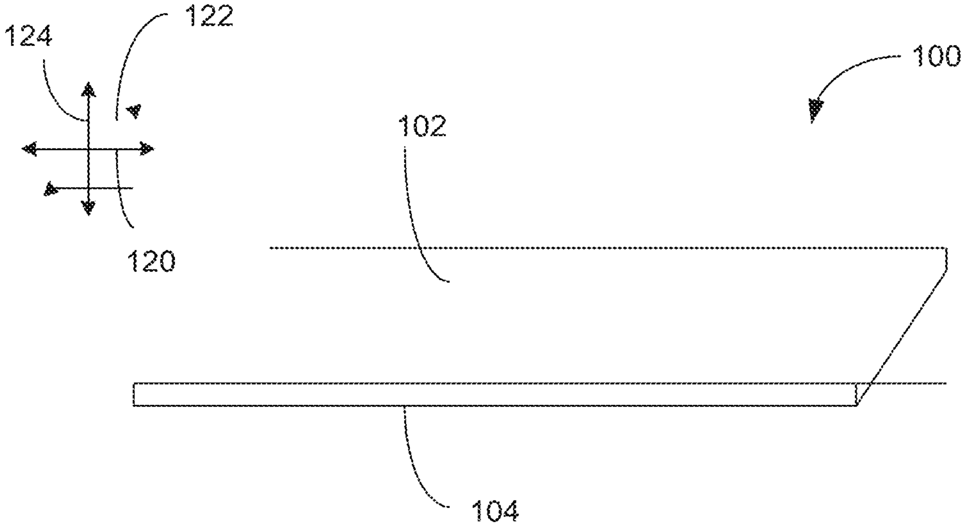
FIG. 1 is a schematic perspective view of an exemplary LCP composite film.

The liquid crystal polymer composite ("LCP composite") of the present disclosure includes a blend of one or more liquid crystal polymer materials and one or more fillers.

A liquid crystal polymer ("LCP") is a polymer that, by itself, is anisotropic when tested using the thermo-optical test (TOT) or any reasonable variation thereof, as described in U.S. Pat. No. 4,118,372, which is hereby incorporated by reference.

LCP materials are anisotropic materials and their mechanical and electrical properties can be different in directions parallel or transverse to the flow direction (machine direction).

There are three types of Liquid Crystal polymers that have been developed for industrial applications. All are based on the utilization of hydroxybenzoic acid. Type I was the first and used by Sumitomo and Solvay, have the highest heat deflection temperature and are used mainly for connectors. Type II and Type III are "copolymers" which have been developed to lower the temperature resistance and to optimize the processing of LCPs.

This invention relates to compounded systems including fillers which can be applied to all of the three types of LCPs to adjust the properties which make them a "composite" with unique properties for high frequency circuit applications. Thus, this invention relates to both homopolymers and copolymers of HBA (hydroxybenzoic acid).

| Type | Molecular Structure | TDUL |
| --- | --- | --- |
| Type I | 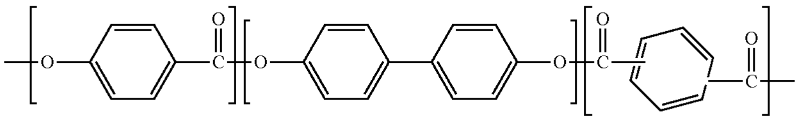 | >260° C. |
| Type II | 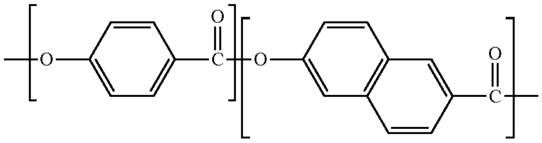 | 210-260° C. |
| Type III | 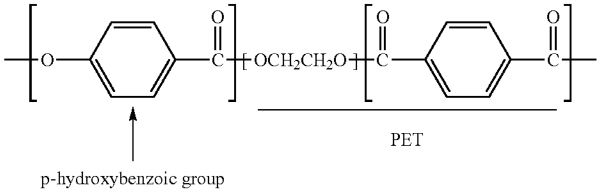 | <210° C. |

LCPs are typically derived from monomers that include aromatic hydroxycarboxylic acids, aromatic dicarboxylic acids, aliphatic dicarboxylic acids, aromatic diols, aliphatic diols, aromatic hydroxyamines, and/or aromatic diamines. For example, they may be aromatic polyesters that are obtained by polymerizing one or two or more aromatic hydroxycarboxylic acids; aromatic polyesters obtained by polymerizing aromatic dicarboxylic acids, one or two or more aliphatic dicarboxylic acids, aromatic dials, and one or two or more aliphatic dials, or aromatic hydroxycarboxylic acids; aromatic polyesters obtained by polymerizing one or two or more monomers selected from a group including aromatic dicarboxylic acids, aliphatic dicarboxylic acids, aromatic diols, and aliphatic dials, aromatic polyester amides obtained by polymerizing aromatic hydroxyamines, one or two or more aromatic diamines, and one or two or more aromatic hydroxycarboxylic acids; aromatic polyester amides obtained by polymerizing aromatic hydroxyamines, one or two or more aromatic diamines, one or two or more aromatic hydroxycarboxylic acids, aromatic dicarboxylic acids, and one or two or more aliphatic carboxylic acids; and aromatic polyester amides obtained by polymerizing aromatic hydroxyamines, one or two or more aromatic diamines, one or two or more aromatic hydroxycarboxylic acids, aromatic dicarboxylic acids, one or two or more aliphaticcarboxylic acids, aromatic diols, and one or two or more aliphatic diols.

Examples of aromatic hydroxycarboxylic acids include 4-hydroxybenzoic acid, 3-hydroxybenzoic acid, 2-hydroxybenzoic acid, 6-hydroxy-2-naphthoic acid, and halogen-, alkyl-, or allyl-substituted derivatives of hydroxybenzoic acid.

Examples of aromatic dicarboxylic acids include terephthalic acid; isophthalic acid; 3,3'-diphenyl dicarboxylic acid; 4,4'-diphenyl dicarboxylic acid; 1,4-naphthalene dicarboxylic acid; 1,5-naphthalene dicarboxylic acid; 2,6-naphthalene dicarboxylic acid; and alkyl- or halogen-substituted aromatic dicarboxylic acids, such as t-butylterephthalic acid, chloroterephthalic acid, etc.

Examples of aliphatic dicarboxylic acids include cyclic aliphatic dicarboxylic acids; such as trans-1,4-cyclohexane dicarboxylic acid; cis-1,4-cyclohexane dicarboxylic acid; 1,3-cyclohexane dicarboxylic acid; and substituted derivatives thereof.

Examples of aromatic diols include hydroquinone; biphenol; 4,4'-dihydroxydiphenyl ether; 3,4'-dihydroxydiphenyl ether; bisphenol A; 3,4'-dihydroxydiphenylmethane; 3,3'-dihydroxydiphenylmmethane; 4,4'-dihydroxydiphenylsulfone; 3,4'-dihydroxydiphenylsulfone; 4,4'-dihydroxydiphenylsulfide; 3,4'-dihydroxdiphenylsulfide; 2,6'-naphthalenediol; 1,6'-naphthalenediol; 4,4'-dihydroxybenzophenone; 3,4'-dihydroxybenzophenone; 3,3'-dihydroxybenzophenone; 4,4'-dihydroxydiphenyldimethylsilane; and alkyl- and halogen-substituted derivatives thereof.

Examples of aliphatic dials include cyclic, linear, and branched aliphatic diols, such as trans-1,4-hexanediol; cis-1,4-hexanediol; trans-1,3-cyclohexanediol; cis-1,2-cyclohexanediol; ethylene glycol; 1,4-butanediol; 1,6-hexanediol; 1,8-octanediol; trans-1,4-cyclohexanedimethanol; cis-1,4-cyclohexanedimethanol; etc., and substituted derivatives thereof.

Examples of aromatic hydroxyamines and aromatic diamines include 4-aminophenol, 3-aminophenol, p-phenylenediamine, m-phenylenediamine, and substituted derivatives thereof.

The one or more LCPs may be produced using any method known in the art. For example, they can be produced by standard polycondensation techniques (melt polymerization, solution polymerization, and solid-phase polymerization). In some embodiments, it is desirable for the LCP to be produced in an inert gas atmosphere under anhydrous conditions. For example, in the melt acidolysis method, the necessary quantities of acetic anhydride, 4-hydroxybenzoic acid, diol, and terephthalic acid are stirred, after which they are heated in a reaction vessel provided with a combination of a nitrogen introduction tube and a distillation head or cooler; the side reaction products, such as acetic acid, are removed through the distillation head or cooler, after which they are collected. After the quantity of collected side reaction products becomes constant, and the polymerization is almost completed, the melted lump is heated under a vacuum (ordinarily, 10 mmHg or lower) and the remaining side reaction products are removed, completing the polymerization.

In some embodiments, the one or more LCPs have number average molecular weights in the range of about 2,000 to about 200,000. In other embodiments, the LCPs have number average molecular weights in the range of about 5,000 to about 50,000. In other embodiments, the LCPs have number average molecular weights in the range of about 10,000 to about 20,000. Molecular weight may affect melt viscosity of the LCP.

The one or more LCPs included in the LCP composite are preferably thermoplastic polyester polymers containing rigid mesogenic linkages. In some embodiments, the one or more LCP polymers have crystalline melting points in the range of about 250° C. to 375° C. In other embodiments, the one or more LCP polymers more have crystalline melting points in the range of about 270° C. to 355° C.

The one or more LCPs may be classified as neat polymers in that, prior to combination with the one or more fillers, they are not reinforced by, filled/mixed with, or otherwise modified by additional material.

Exemplary LCPs that may be used in the film are thermoplastic polyester polymers including monomer units derived from 4-hydroxybenzoic acid and 6-hydroxy-2-naphthoic acid; thermoplastic polyester polymers including monomer units derived from 6-hydroxy-2-naphthoic acid, terephthalic acid, and acetaminophen; and thermoplastic polyester polymers including monomer units derived from 4-hydroxybenzoic acid, terephthalic acid and 4, 4'-biphenol.

Exemplary LCPs are those available from Celanese Corporation under the trademark VECTRA®. These include VECTRA® A polymer (e.g., VECTRA® A950), VECTRA® B polymer (e.g., VECTRA® B950), VECTRA® C polymer (e.g., VECTRA® C950).

VECTRA® A polyester includes 73 mole % of monomer units derived from 4-hydroxybenzoic acid ("HBA") having the formula:

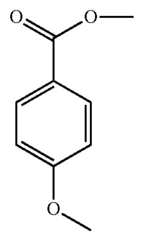

and 27 mole % of monomer units derived from 2,6-hydroxynaphthoic acid ("HNA") having the formula:

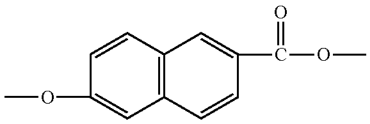

VECTRA® A950 has a melting point of about 278° C.

VECTRA® B polyester includes 60 mole % of monomer units derived from HNA, 20 mole % of monomer units derived from TA, and 20 mole % of monomer units derived from acetaminophenol having the formula:

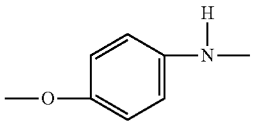

VECTRA® B950 has a melting point of about 280° C.

VECTRA® C polyester includes 80 mole % of monomer units derived from HBA and 20 mole % of monomer units derived from HNA. VECTRA® C950 has a melting point of about 320° C.

The total amount of LCP present in the composite may be in the range of 40 wt % to 95 wt %, based on the total weight of the composition. In other embodiments, the total amount of LCP present in the composite may be in the range of 50 wt % to 85 wt %, based on the total weight of the composition. In other embodiments, the total amount of LCP present in the composite may be in the range of 60 wt % to 85 wt %, based on the total weight of the composition. In other embodiments, the total amount of LCP present in the composite may be in the range of 70 wt % to 80 wt %, based on the total weight of the composition.

Exemplary fillers that may be included as the one or more fillers in the LCP composite include zeolite, fused silica, talc, or a combination thereof. The one or more fillers included in the LCP composite may have a low dielectric permittivity (Dk). The one or more fillers included in the LCP composite film may be fillers that are mechanically robust, temperature stable, and have a suitable size that may allow for combination with the one or more LCPs in forming the LCP composite and allow for manufacture of a desired product (e.g., film) without destroying (e.g., crushing, melting, etc.) the filler.

Zeolites in general are microporous crystalline materials with generally uniform molecular-sized pores and generally low theoretical dielectric constants. In some embodiments, aluminium, silicon, and oxygen are included in the framework of the zeolite (e.g., aluminosilicate zeolites). In other embodiments, silicon and oxygen are included in the framework of the zeolite (e.g., silica zeolites). In other embodiments, the zeolite may include one or more additional metals in addition to the aluminium, silicon, and oxygen or silicon and oxygen, such as Ti, Sn, and/or Zn.

In some embodiments, the average pore diameters of the pores of the zeolite may be 2 nm or less. The pores may be host to water molecules and/or ions. In other embodiments, the pores may include air. Exemplary zeolites include Pentasil (MFI) zeolites available from Clariant AG. These include Pentasil (MFI) CZP 800, Pentasil (MFI) CZP 200, Pentasil (MFI) CZP 90, Pentasil (MFI) CZP 30, and Pentasil (MFI) CZP 27.

Fused silica is glass consisting of silica in amorphous (non-crystalline) form. Examples include sol-gel silica and organic-templated mesoporous silica. Sol-gel silica offers the ability to tune the Dk value. Organic-templated mesoporous silica is class of materials may provide more uniform pores than sol-gel silica (with a range of pore size of up to about 100 nm) and has been shown to have promising Dk values.

Talc is a hydrous magnesium silicate mineral with a chemical composition of Mg3Si4O10(OH)2. Although the composition of talc usually stays close to this generalized formula, some substitution may occur. Small amounts of Al or Ti can substitute for Si; and small amounts of Fe, Mn, Al, and/or Ca can substitute for Mg.

The total amount of filler present in the LCP composite may be in the range of 5 wt % to 60 wt %, based on the total weight of the composition. In other embodiments, the total amount of filler present in the LCP composite may be in the range of 15 wt % to 50 wt %, based on the total weight of the composition. In other embodiments, the total amount of filler present in the LCP composite may be in the range of 15 wt % to 40 wt %, based on the total weight of the composition. In other embodiments, the total amount of filler present in the LCP composite may be in the range of 15 wt % to 35 wt %, based on the total weight of the composition. In other embodiments, the total amount of filler present in the LCP composite may be in the range of 15 wt % to 30 wt %, based on the total weight of the composition.

In some embodiments, the LCP composite may include one or more additives in addition to the of one or more liquid crystal polymer ("LCP") materials and one or more fillers. Exemplary fillers include pigments, carbon black, carbon fibers, glass fibers, and the like. The total amount of additive present in the LCP composite may be in the range of 0.001 wt % to 5 wt %, based on the total weight of the composition. In other embodiments, the total amount of additive present in the LCP composite may be in the range of 0.01 wt % to 3 wt %, based on the total weight of the composition. In other embodiments, the total amount of additive present in the LCP composite may be in the range of 0.1 wt % to 1 wt %, based on the total weight of the composition. In other embodiments, the LCP composite may not include one or more additives in addition to the of one or more liquid crystal polymer ("LCP") materials and one or more fillers.

The LCP composite may be formed by melting and combining the one or more LCPs with the one or more fillers. In some embodiments, upon melting the one or more LCP materials and combining with the one or more fillers, the LCP composite may be formed into pellets or another suitable form that may be used as an LCP composite resin in subsequent production of a product. In other embodiments, upon melting the one or more LCP materials and combining with the one or more fillers, the LCP composite may be directly used in the formation of a product. For example, the LCP composite may be formed into a film. The film may be formed by a melt extrusion process, injection molding process, or another suitable process. In an exemplary melt extrusion process, the LCP composite may be extruded onto various casting rolls and cooled such that the one or more LCPs of the LCP composite are solidified and the LCP composite is provided in a film form.

Like molecular weight, the amount and type of fillers may affect melt viscosity. For example, a neat resin having a viscosity of 21 Pa-s is compared to a higher molecular weight resin having a viscosity of 27 Pa-s. Both resins are compounded with filler (neat resin with 45 wt % filler, and high molecular weight resin with 20 wt % filler). The compounded resins melt viscosity are significantly affected:

neat resin after compounding has a viscosity of 57 Pa-s, and the high molecular weight resin after compounding has a viscosity of 36 Pa-s. All viscosity measurements were conducted at a melt temperature of 320 C and at a shear rate of 1800 (1/s) using a LCR 7000 Capillary Rheometer from Dynsico having a barrel diameter of 0.376 inches, a die diameter of 0.762 mm, a die length of 30.48 mm and a cone angle of 120 degrees. Melt viscosity can be adjusted to create compounded materials which are not processable and preferably the melt viscosity is kept under 120 Pa-s. It is more preferable to keep melt viscosity at or under 80 Pa-s, but is also preferable to increase the viscosity relative a neat resin to at least 30 Pa-s.

A "film" is an article of manufacture having opposed major surfaces, each extending in a length direction and a width direction orthogonal to the width direction, the opposed major surfaces spaced from one another in a thickness direction orthogonal to the length direction and to the width direction. FIG. 1 shows an exemplary LCP composite film 100 including opposed major surfaces 102, 104.

Each of the major surfaces extends in in the length direction 120 and the width direction 122 orthogonal to the width direction. In embodiments where the film is produced by a process such as extrusion, the length direction may also be referred to as a machine direction, and the width direction may also be referred to as a transverse direction. The major surfaces 102, 104 are spaced apart from one another in the thickness direction 124 orthogonal to the length direction 120 and the width direction 122.

In some embodiments, the LCP composite film is produced as a sheet having a given length and a given width. In other embodiments, the film is produced as a continuous roll having a given width, which may in-turn be subsequently cut to length.

The LCP composite film may have mechanical properties that may be suitable for use as part of an antenna assembly.

For example, the thickness of the LCP composite film (i.e., in the thickness direction extending between the major surfaces of the film) may be in the range of 1 μm-250 μm. In some embodiments, the thickness of the LCP composite film may be in the range of 10 μm-200 μm. In other embodiments, the thickness of the LCP composite film may be in the range of 25 μm-150 μm. In other embodiments, the thickness of the LCP composite film may be in the range of 25 μm-100 μm. In other embodiments, the thickness of the film may be in the range of 25 μm-50 μmin some embodiments, the thickness tolerance of the LCP composite film is ±1 μm. In other embodiments, the thickness tolerance of the LCP composite film is ±0.05 μm.

The tensile modulus of the LCP composite may be measured in accordance with IPC-TM-650 2.4.19 Tensile Strength and Elongation and ASTM D882, the disclosures of which is hereby incorporated by reference in its entirety. In some embodiments, the tensile modulus of the LCP composite film in the machine direction and in the transverse direction is in the range of 50 Mpa-10 GPa. In other embodiments, the tensile modulus of the LCP composite film in the machine direction and in the transverse direction is in the range of 90 Mpa-10 GPa. In other embodiments, the tensile modulus of the LCP composite film in the machine direction and in the transverse direction is in the range of 98 Mpa-10 GPa. In other embodiments, the tensile modulus of the LCP composite film in the machine direction and in the transverse direction is in the range of 1 GPa-10 Gpa. In other embodiments, the tensile modulus of the LCP composite film in the machine direction and in the transverse direction is in the range of 5 Gpa-10 GPa.

The elongation may be measured in accordance with IPC-TM-650 2.4.19 Tensile Strength and Elongation, the disclosure of which is hereby incorporated by reference in its entirety. In some embodiments, the balanced elongation of the LCP composite film in the machine direction and in the transverse direction is in the range of 2%-20%. In other embodiments, the balanced elongation of the LCP composite film in the machine direction and in the transverse direction is in the range of 2%-15%. In other embodiments, the balanced elongation of the LCP composite film in the machine direction and in the transverse direction is in the range of 2%-10%. In other embodiments, the balanced elongation of the LCP composite film in the machine direction and in the transverse direction is in the range of 5%-10%.

The CTE (or dimensional stability) may be measured in accordance with IPC-TM-650 2.2.4 Dimensional Stability, the disclosure of which is hereby incorporated by reference in its entirety. In some embodiments, the coefficient of thermal expansion (CTE) of the LCP composite film in the machine direction and in the transverse direction is in the range of −20 ppm/° C. to 100 ppm/° C. In other embodiments, the coefficient of thermal expansion (CTE) of the LCP composite film in the machine direction and in the transverse direction is in the range of 0 ppm/° C. to 85 ppm/° C.

The LCP composite film may possess electrical properties that may be suitable for use as part of an antenna assembly. For example, the LCP composite film may possess a low in-plane dielectric permittivity (Dk) and low loss tangent (tan(δ)) in a high frequency range such that the LCP composite film is suitable for use as part of an antenna assembly. The in-plane dielectric permittivity (Dk) and loss tangent (Df) of the formed LCP composite films may be measured in accordance with ASTM D2520-13, the disclosure of which is hereby incorporated by reference in its entirety.

"Dielectric permittivity" (Dk) of a material is its (absolute) permittivity expressed as a ratio relative to the electric constant (i.e., relative to the value of the absolute dielectric permittivity of classical vacuum). This dimensionless quantity may also be referred to as "relative permittivity."

"In-plane" dielectric permittivity (Dk) is the dielectric permittivity as measured with the length direction (e.g., machine direction) or width direction (e.g., transverse direction) arranged along the field direction.

"Loss tangent" (tan(δ)) is a measure of a material's inherent dissipation of electromagnetic energy (electromagnetic wave absorption by the dielectric material). Loss tangent may also be referred to as dissipation factor (Df). A lower loss tangent results in lower dissipation of electromagnetic energy, which means less electromagnetic wave absorption by the dielectric material of the original transmitted electromagnetic wave. A large loss tangent means more dielectric absorption, which means more electromagnetic wave absorption by the dielectric material of the original transmitted electromagnetic wave.

In some embodiments, the in-plane dielectric permittivity (Dk) of the LCP composite film in each of the machine direction and in the transverse direction at 10 GHz is in the range of 2.40-4.00. In other embodiments, the in-plane dielectric permittivity (Dk) of the LCP composite film in each of the machine direction and in the transverse direction at 10 GHz is in the range of 2.60-3.80. In other embodiments, the in-plane dielectric permittivity (Dk) of the LCP composite film in each of the machine direction and in the transverse direction at 10 GHz is in the range of 2.80-3.70.

In other embodiments, the in-plane dielectric permittivity (Dk) of the LCP composite in each of the machine direction and in the transverse direction at 10 GHz is in the range of 2.80-3.50.

In some embodiments, the LCP composite may possess a relatively steady in-plane dielectric permittivity (Dk) over a range of frequencies. For example, in some embodiments, the in-plane dielectric permittivity (Dk) of the LCP composite film in each of the machine direction and in the transverse direction may be in the range of 2.40-4.00 over the frequency range of 1 GHz to 10 GHz. In other embodiments, the in-plane dielectric permittivity (Dk) of the LCP composite film in each of the machine direction and in the transverse direction may be in the range of 2.60-3.80 over the frequency range of 1 GHz to 10 GHz. In other embodiments, thein-plane dielectric permittivity (Dk) of the LCP composite film in each of the machine direction and in the transverse direction may be in the range of 2.80-3.70 over the frequency range of 1 GHz to 10 GHz. In other embodiments, the in-plane dielectric permittivity (Dk) of the LCP composite film in each of the machine direction and in the transverse direction may be in the range of 2.80-3.50 over the frequency range of 1 GHz to 10 GHz.

The LCP composite of the present disclosure may provide low anisotropy with respect to the dielectric permittivity (Dk) of the formed LCP composite film. In some embodiments, the ratio of the dielectric permittivity (Dk) in the machine direction to the dielectric permittivity (Dk) in the transverse direction at 10 GHz for a film having a thickness of 10 μm to 200 μm is in the range of 1.0-1.4. In other embodiments, the ratio of the dielectric permittivity (Dk) in the machine direction to the dielectric permittivity (Dk) in the transverse direction at 10 GHz for a film having a thickness of 10 μm to 200 μm is in the range of 1.0-1.35. In other embodiments, the ratio of the dielectric permittivity (Dk) in the machine direction to the dielectric permittivity (Dk) in the transverse direction at 10 GHz for a film having a thickness of 10 μm to 200 μm is in the range of 1.0-1.25. In other embodiments, the ratio of the dielectric permittivity (Dk) in the machine direction to the dielectric permittivity (Dk) in the transverse direction at 10 GHz for a film having a thickness of 10 μm to 200 μm is in the range of 1.0-1.20.

In some embodiments, the loss tangent (Df) of the LCP composite film in each of the machine direction and in the transverse direction at 10 GHz is less than 0.003. In other embodiments, the loss tangent (Df) of the LCP composite film in each of the machine direction and in the transverse direction at 10 GHz is in the range of 0.003-0.0001.

In some embodiments, the LCP composite may possess a relatively steady loss tangent (Df) over a range of frequencies. For example, in some embodiments, the loss tangent (Df) of the LCP composite film in each of the machine direction and in the transverse direction may be less than 0.003 over the frequency range of 1 GHz to 10 GHz. In other embodiments, the loss tangent (Df) of the LCP composite film in each of the machine direction and in the transverse direction may in the range of 0.003-0.0001 over the frequency range of 1 GHz to 10 GHz.

The LCP composite of the present disclosure may provide low anisotropy with respect to the loss tangent (Df) of the formed LCP composite film. In some embodiments, the ratio of the loss tangent (Df) in the machine direction to the loss tangent (Df) in the transverse direction at 10 GHz for a film having a thickness of 10 μm to 200 μm is in the range of 0.2-1.0. In other embodiments, the ratio of the loss tangent (Df) in the machine direction to the loss tangent (Df) in the transverse direction at 10 GHz for a film having a thickness of 10 μm to 200 μm is in the range of 0.5-1.0.

Examples—LCP Composite Films

LCP composite films are formed by melt extrusion. The LCP neat resin is melted and combined with the filler, and extruded at a predetermined thickness. Table 1 sets forth the respective compositions and thicknesses of the extruded films.

TABLE 1

Exemplary LCP Composites

| Examples | LCP (wt %) | Filler (wt %) | Thickness (μm) |
|---|---|---|---|
| 1 | VECTRA ® A950 (80%) | zeolite (20%) | 25 |
| 2 | VECTRA ® A950 (70%) | fused silica (30%) | 50 |
| 3 | VECTRA ® A950 (60%) | zeolite (40%) | 100 |
| 4 | VECTRA ® A950 (55%) | fused silica (45%) | 100 |
| 5 | VECTRA ® A950 (80%) | talc (20%) | 50 |
| 6 | VECTRA ® A950 (80%) | talc (20%) | 50 |
| 7 | VECTRA ® A950 (53%) | fused silica (47%) | 50 |
| 8 | VECTRA ® A950 (45%) | fused silica (55%) | 50 |
| 9 | VECTRA ® A950 (45%) | fused silica (55%) | 200 |
| 10 | VECTRA ® A950 (53%) | zeolite (47%) | 200 |

Table 2 sets forth the electrical properties of the LCP composite Examples described in Table 1. The in-plane dielectric permittivity (Dk) and loss tangent (Df) of the formed LCP composite films are measured in accordance with IPC-TM-650 2.5.5.3 (or ASTM D2520-13-confirm) Permittivity (Dielectric Constant) and Loss Tangent (Dissipation Factor) of Materials, the disclosure of which are hereby incorporated by reference in their entirety. Specimens of each of the Examples 1-10 are tested in accordance with such testing procedures, and the results are set forth in the table. The films are measured as a function of frequency, and Table 2 shows average dielectric permittivity (Dk) of the Examples at 10 GHz. Film specimens of Examples 1 and 2 are also tested to measure dissipation factor (Df) in both the machine direction and traverse direction, and Table 2 shows the average dissipation factor (Df) of the Examples at 10 GHz.

TABLE 2

| Electrical Properties | | | | | | | | |
|---|---|---|---|---|---|---|---|---|
| Example | Average Dk MD @10 Ghz | Average Dk TD @10 Ghz | Dk Average @10 Ghz | Dk Ratio (MD/TD) @10 Ghz | Average Df MD @10 Ghz | Average Df TD @10 Ghz | Df Average @10 Ghz | Df Ratio (MD/TD) @10 Ghz |
| 1 | 3.07 | 2.42 | 2.75 | 1.27 | 0.0019 | 0.0030 | 0.00245 | 0.63 |
| 2 | 2.99 | 2.48 | 2.74 | 1.21 | 0.0005 | 0.0009 | 0.0012 | 0.55 |
| 3 | 2.97 | 2.63 | 2.8 | 1.13 | 0.0047 | 0.0042 | 0.0045 | 1.10 |
| 4 | 3 | 2.73 | 2.87 | 1.1 | 0.0015 | 0.0016 | 0.0016 | 0.94 |
| 5 | 3.66 | 2.78 | 3.22 | 1.32 | 0.0012 | 0.0018 | 0.0015 | 0.67 |
| 6 | 3.52 | 2.84 | 3.18 | 1.24 | 0.0011 | 0.0018 | 0.0015 | 0.61 |
| 7 | 2.67 | 2.39 | 2.53 | 1.12 | 0.0010 | 0.0010 | 0.0010 | 1.00 |
| 8 | 2.85 | 2.54 | 2.7 | 1.12 | 0.0011 | 0.0008 | 0.0010 | 1.38 |
| 9 | 3.20 | 2.93 | 3.06 | 1.09 | 0.0024 | 0.0022 | 0.0023 | 1.09 |
| 10 | 3.11 | 2.89 | 3.00 | 1.08 | 0.0074 | 0.0075 | 0.0075 | 0.99 |

The in-plane dielectric permittivity (Dk) relative to frequency was measured between a frequency range of 2 GHz to 11 GHz. The in-plane dielectric permittivity (Dk) in the machine direction and in the transverse direction remain relatively constant.

Table 3 sets forth the tensile modulus of Examples 1-4 described in Table 1. The tensile modulus is measured in accordance with IPC-TM-650 2.4.19 Tensile Strength and Elongation. Specimens of each of the Examples 1~4 are tested in accordance with such testing procedures, and the results are set forth in the table.

TABLE 3

| Mechanical Properties - Tensile Modulus (Gpa) | | | |
|---|---|---|---|
| Example | Tensile Modulus MD (Gpa) | Tensile Modulus TD (Gpa) | Tensile Modulus Ratio (MD/TD) |
| 1 | 1.15 | 9.76 | 0.12 |
| 2 | 1.34 | 6.74 | 0.20 |
| 3 | 10.01 | 4.11 | 2.44 |
| 4 | 14.33 | 3.9 | 3.67 |

Table 4 sets forth the coefficient of thermal expansion (CTE) of Examples 1-4 described in Table 1. The CTE (or dimensional stability) is measured in accordance with IPC-TM-650 2.2.4 Dimensional Stability. Specimens of each of the Examples 1-4 are tested in accordance with such testing procedures, and the results are set forth in the table.

TABLE 4

| Mechanical Properties - CTE (ppm) | | | |
|---|---|---|---|
| Example | CTE MD (ppm) | CTE TD (ppm) | CTE Ratio (MD/TD) |
| 1 | −9.0 | 80.0 | −0.11 |
| 2 | 2 | 77 | 0.03 |
| 3 | 12 | 64 | 0.188 |
| 4 | 6 | 63 | 0.095 |

Table 5 sets forth the elongation of the Examples described in Table 1. The elongation is measured in accordance with IPC-TM-650 2.4.19. Specimens of each of the Examples 1-4 are tested in accordance with such testing procedures, and the results are set forth in the table.

TABLE 5

| Mechanical Properties - Elongation (%) | | | |
|---|---|---|---|
| Example | Elongation MD (%) | Elongation TD (%) | Elongation Ratio (MD/TD) |
| 1 | 3.82 | 4.37 | 0.874 |
| 2 | 5.65 | 8.42 | 0.67 |
| 3 | 2.43 | 1.01 | 2.41 |
| 4 | 2.39 | 1.97 | 1.21 |

Figure 2:
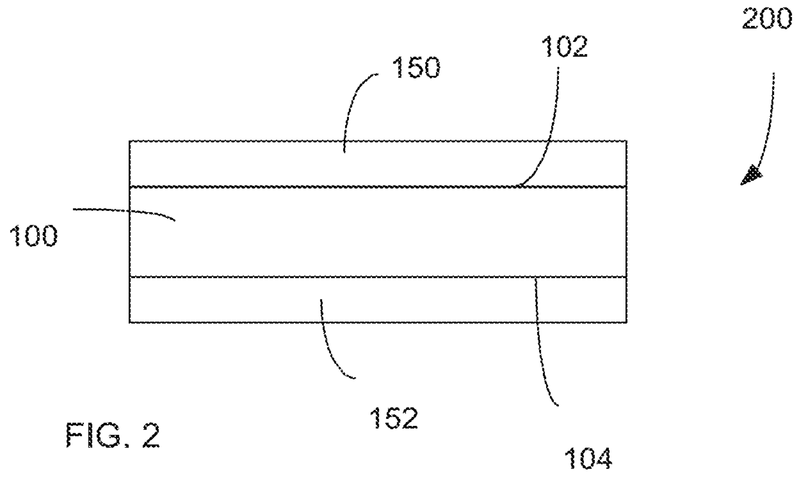
FIG. 2 is a schematic side view of an exemplary metal-clad laminate.
Figure 3:
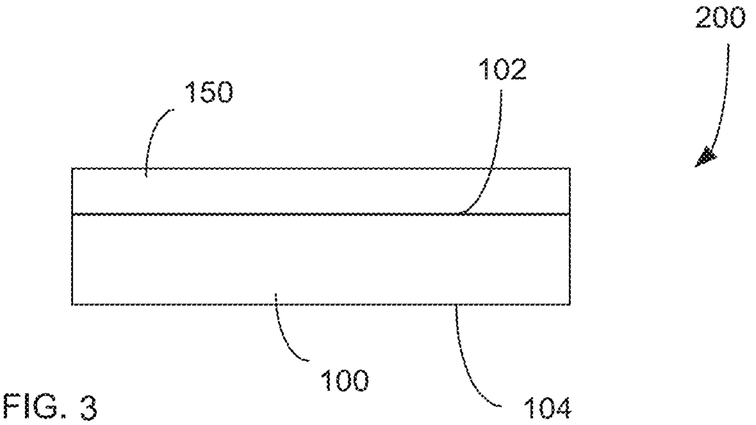
FIG. 3 is a schematic side view of another exemplary metal-clad laminate.
Figure 4:
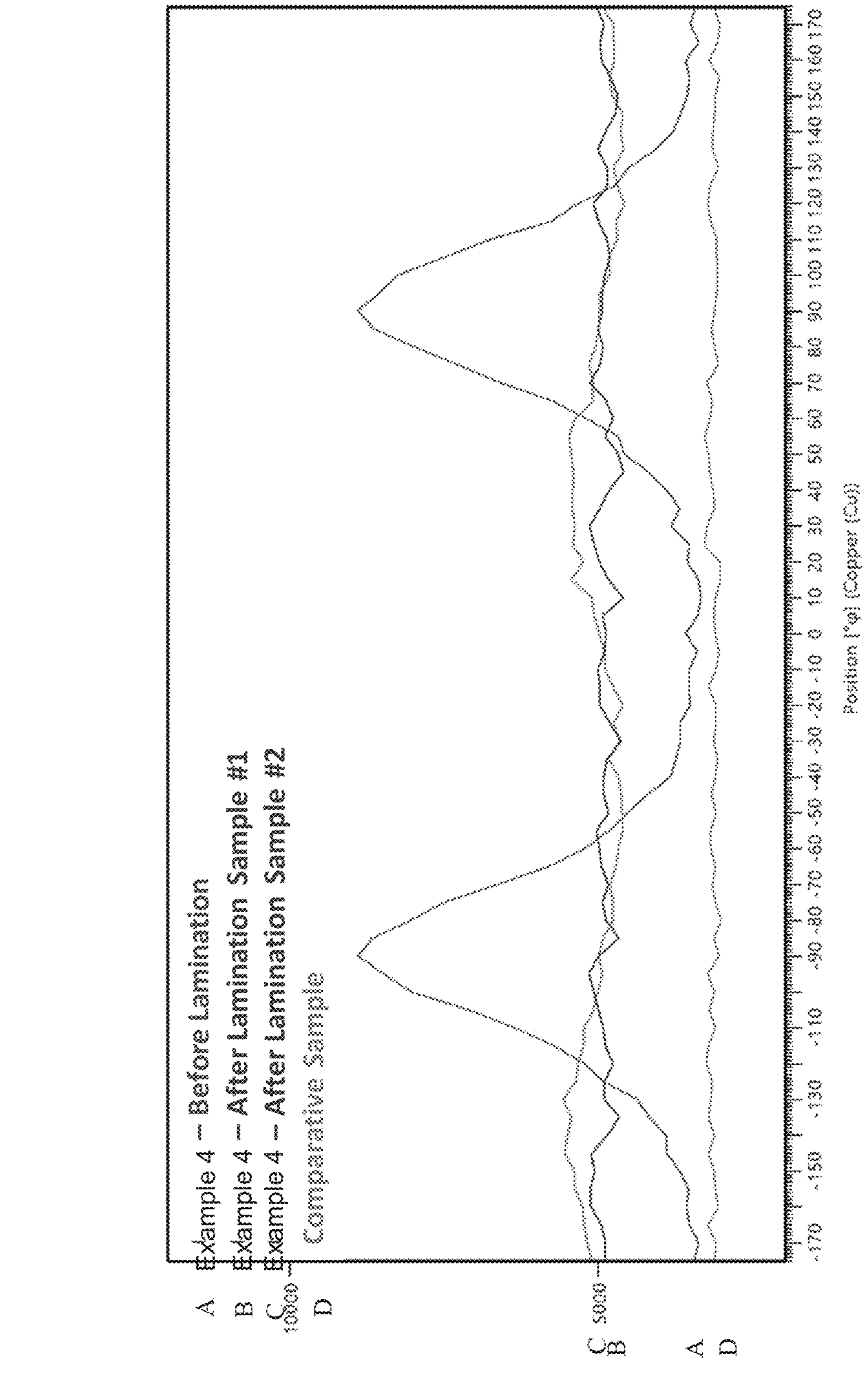
FIG. 4 and FIG. 5 are graphs showing X-ray diffraction (XRD) data of LCP composite films and metal-clad laminates.
Figure 5:
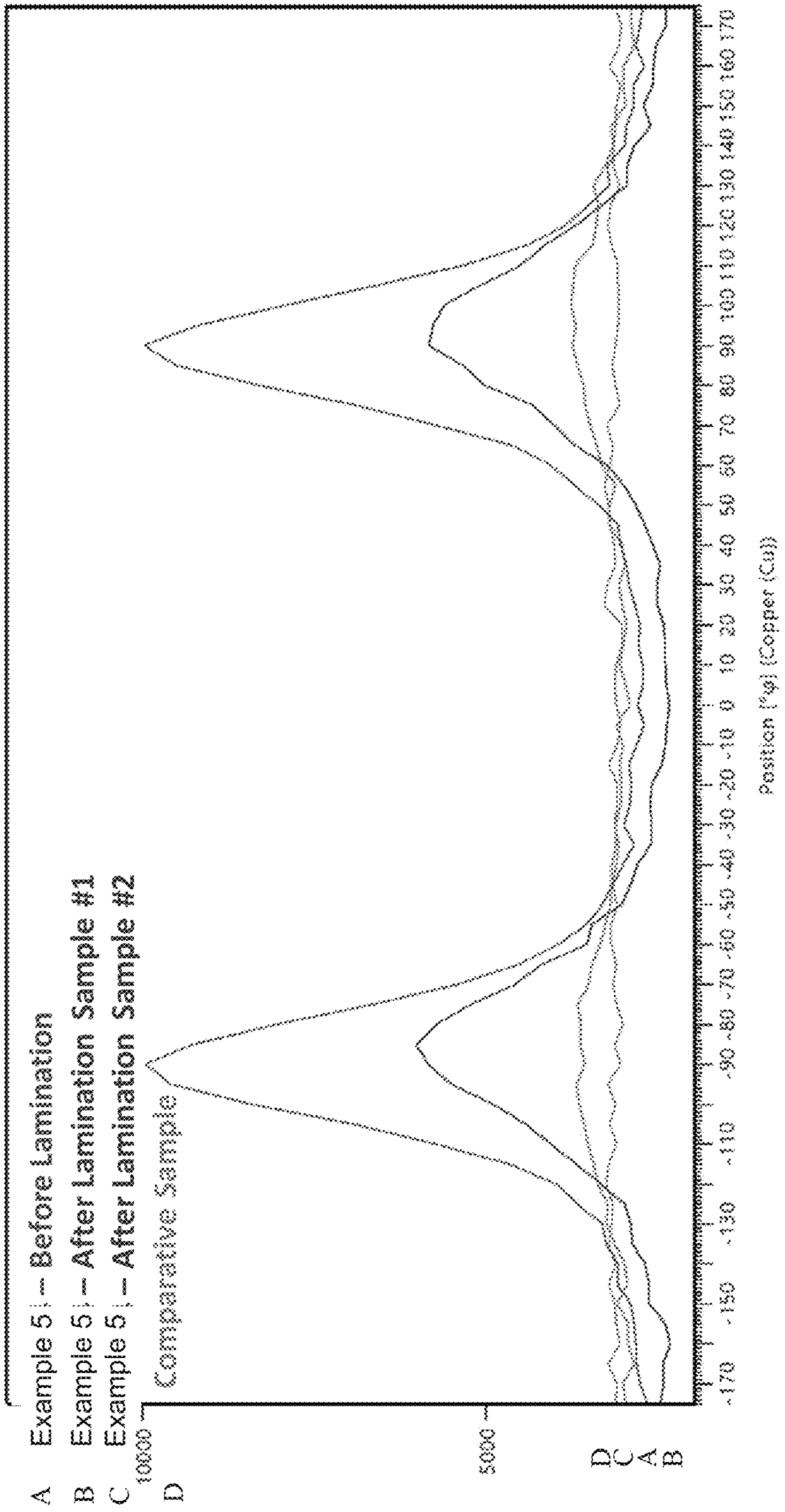

Turning now to FIGS. 4 and 5, a metal-clad laminate may include the LCP composite film of the present disclosure. The metal-clad laminate may include a structure in which one or more-metal clad layers are laminated to the LCP composite film. FIG. 2 shows an exemplary embodiment in which a metal clad layer 150 is provided at one major surface 102 of the LCP composite film, and another metal-clad layer 152 is provided at the other major surface 104 of the LCP composite film 100. FIG. 3 shows an exemplary embodiment in which a metal-clad layer 150 is provided at one major surface 102 of the LCP composite film 100.

The metal-clad laminate may include a third component layer comprising a film laminated to within the metal-clad laminate to provide functionality. The third component layer (not shown) may comprise polytetrafluoroethylene, glass-reinforced epoxy laminate film such as FR-4, polyimide films and combinations thereof. The functionality provided by such a third component layer may provide for a metal-clad laminate which can function as a printed circuit board.

Exemplary metals that may be used in the one or more metal-clad layers include one or more electrically conductive metals such as copper, aluminum, copper alloys, aluminum alloys, and the like. Exemplary copper includes MHT copper and rolled annealed (RA) copper. The one or more metals may provide good adhesion to the LCP composite. In embodiments where there are more than one metal-clad layer, the material of one metal-clad layer may be the same or may be different than the material of the other clad layer(s). RA copper foils are manufactured by a rolling process after the copper is cast in a block, whereas ED copper foils are manufactured by a galvanic process in which the copper is deposited onto a rotating drum. RA copper foils can be rolled to desired thicknesses of about 6-500 microns. Each surface is smooth but can be roughened is desired. ED copper foils have a rough and smooth side and are typically 6-25 microns in thickness. It some embodiments the roughness of the surface adjacent the LCP composite film may be selected to be less than 5 microns or equal to or less than 3 microns (Rz Ten point mean roughness) as measured by the methods described in JIS B 0601-2001.

In some embodiments, the thickness of the metal-clad layer is in the range of 5-50 μm. In other embodiments, the thickness of the metal-clad laminate (e.g., copper) is in the range of 10 μm-40 μm. In other embodiments, the thickness of the metal-clad laminate is in the range of 10 μm-30 μm. In other embodiments, the thickness of the metal-clad laminate is in the range of 10 μm-20 μm. In some embodiments where there are more than one metal clad layer, the thickness of one metal-clad layer may be different than the thickness of the other clad layer(s). In other embodiments where there are more than one metal-clad layer, the thickness of one metal-clad layers may be the same.

In an exemplary lamination process, the metal-clad laminate may be produced by preheating platens, placing the stack of the LCP composite film and the one or more metal layers between the platens, and applying a predetermined amount of pressure to the layers while heating the layers to a predetermined temperature to form the laminate. After a predetermined amount of time, the formed laminate may be removed from the platens and allowed to cool. In some embodiments, the predetermined temperature is greater than 225° C. and less than 325° C. In other embodiments, the predetermined temperature is greater than 250° C. and less than 300° C. In other embodiments, the predetermined temperature is greater than 250° C. and less than 300° C. In some embodiments, the predetermined pressure used in the lamination process is greater than 0.25 tons and less than 5 tons. In other embodiments, the predetermined pressure is greater than 0.75 tons and less than 4.25 tons. The temperature and pressure used may allow for the LCP composite film to be laminated to the one or more metal layers, but may be low enough so as to avoid melting the LCP composite to an extent that causes flow out from the lamination.

The formed laminate may be subsequently subjected to one or more post-formation steps. For example, the metal-clad layer(s) may be etched to form a desired shape of the metal layer. The laminate may be rinsed following etching.

Such lamination may include a release layer disposed between the platens and the adjacent film to minimize adherence of the film relative the platens. Such release layers are designed to maintain a smooth surface of the film and to allow heat flow from the platens to the film. The lamination method may be used to manufacture the single metal-clad laminate shown in FIG. 3, or the double metal-clad laminate shown in FIG. 2. The double metal-clad laminate can be converted to the single metal-clad laminate by etching of one of the exterior metal layers in part or in whole.

Figure 6:
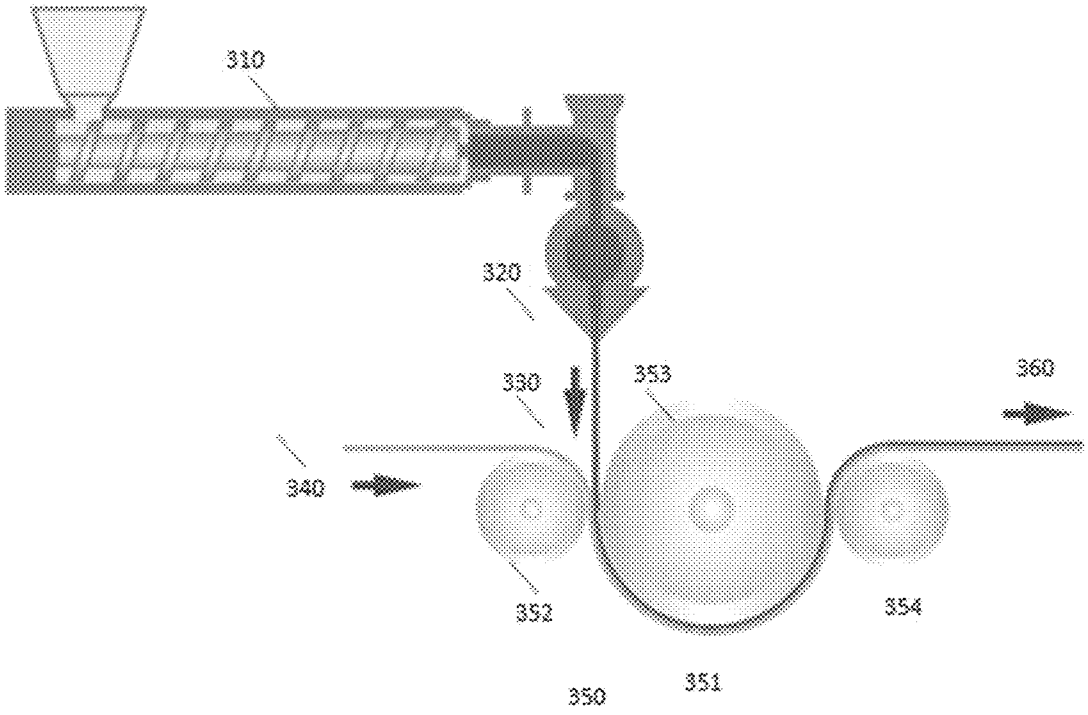
FIG. 6 shows a general arrangement of a film extruder with an associated extrusion die according to an embodiment of the invention.

In an aspect of the lamination process the single clad laminate is formed by combining film extrusion with a calendering process. Referring to FIG. 6, there is shown a general arrangement of a film extruder 310 with an associated extrusion die 320. The extrusion die 320 includes a flat die which can produce a planar liquid film of LCP at a desired thickness and width via die bolt adjustments. The extruder acts to produce the planar LCP film in the form of a hot melt curtain 330.

A metal foil substrate 340 is positioned adjacent a calender 350 which includes both a first roll 351 and a second roll 352. The first 351 and second roll 352 are positioned adjacent each other to create a region of minimal roll separation, which is called a nip region 353. In the nip region 353, the first and second roll surfaces are nearly parallel. The rolls can be biased relative each other to create pressure at the nip region 353. The second roll 352 includes a heated surface capable to transferring heat to substrates that are conveyed over its surface.

The metal foil 340 is heated by being positioned on the second roll 352 while tension is applied to remove and prevent wrinkles in the foil. The second roll surface temperature is variable and can vary from 180 C upwards in order to heat the metal foil to a temperature in the range of 180-220 C. As the metal foil 340 is heated by the second roll 352, it enters the nip region and meets the hot melt curtain which is produced by the extrusion die 320 and extends into the nip region 353 via gravity.

The hot metal curtain 330 mates with the metal foil in the nip region and creates a melt pool (not shown) which is calendered between the two calender rolls and the thickness of a single metal clad laminate 360 is formed at the nip region.

The calender 350 further includes a third roll 354 which is capable of pulling the single metal-clad laminate 360 from the nip region. Post calendering operations can additionally include laminate thickness measurement, laminate trimming and winding.

An aspect of the lamination process is the thickness uniformity of the produced film in both the machine and cross-machine direction. Variations in gap region due to the dimensions of the rolls, thermal effects, and roll distortions due to the high pressures that can develop in the gap, may result in product nonuniformity in the cross-machine direction. Eccentricity of the rolls with respect to the roll shaft, as well as roll vibration and feed uniformity, must be tightly controlled to avoid nonuniformity in the machine direction. A uniform empty gap size may be distorted in operation because of hydrodynamic forces, developed in the nip region, which deflect the rolls. From such a condition, the resulting laminate will be thick in the middle and thin at the edges. Thus the rolls 351 and 352 are ground, hardened and polished and the roll cross diameter is kept within 5 microns every 50 mm along each roll. The roll surfaces are coated with a diamond like coating (DLC) with high hardness and with high release properties and maintains with 0.2 micron Ra after coating. A maximum nip force is maintained at the nip region of 0.13 kN/mm between the roll to produce a 65 micron thick laminate comprises of a 12-35 micron thick metal foil and a 50 micron thick LCP film.

In some embodiments, the ratio of the dielectric permittivity (Dk) in the machine direction to the dielectric permittivity (Dk) in the transverse direction at 10 GHz of the LCP composite film having a thickness of 10 μm to 200 μm and included in the metal-clad laminate is in the range of 1.0-1.2. In other embodiments, the ratio of the dielectric permittivity (Dk) in the machine direction to the dielectric permittivity (Dk) in the transverse direction at 10 GHz of the LCP composite film having a thickness of 10 μm to 200 μm and included in the metal-clad laminate is in the range of 1.0-1.1. In other embodiments, the ratio of the dielectric permittivity (Dk) in the machine direction to the dielectric permittivity (Dk) in the transverse direction at 10 GHz of the LCP composite film having a thickness of 10 μm to 200 μm and included in the metal-clad laminate is in the range of 1.0-1.05.

The low anisotropy of the metal-clad laminate may allow the metal-clad laminate to be used, for example, in telecommunications applications such as a part of an antenna assembly.

The in-plane dielectric permittivity (Dk) of the LCP composite film included in the metal-clad laminate may be measured in accordance with the measurement methods as set forth in Oliver et al., "Round Robin of High Frequency Test Methods by IPC-D24C Task Group", the disclosure of which is hereby incorporated by reference in its entirety. Oliver et al. sets forth other exemplary Microstrip Transmission Line measurement methods, including extraction from impedance, group delay extraction from phase, and differential phase length; as well as a FreeSpace Transmission measurement method, methods involving Perturbed Resonant Cavities with Electric Field Oriented In-Plane of Dielectric, and methods involving Aperture-Coupled Stripline with Electric Field Oriented Normal to Plane of Dielectric. The metal-clad laminates including the LCP composite film may also be measured in accordance with IPC-TM-650 2.5.5.3, IPC-TM-650 2.5.5.9, and IPC-TM-650 2.5.5.5, the disclosures of which are hereby incorporated by reference in their entireties.

The CTE of the LCP composite film included in the metal-clad laminate may be measured in accordance with IPC-TM-650 2.2.4 Dimensional Stability, the disclosure of which is hereby incorporated by reference in its entirety. In some embodiments, the ratio of the CTE of the LCP composite film included in the metal-clad laminate in the machine direction relative to the transverse direction (MD/TD) is in the range of 0.01 to 1.0. In other embodiments, the ratio of the CTE of the LCP composite film included in the metal-clad laminate in the machine direction relative tithe transverse direction (MD/TD) is in the range of 0.2 to 0.8.

Examples—Metal-Clad Laminate Including LCP Composite Film

LCP composite films produced in accordance with Examples 4 and 5 are laminated with RA copper having a thickness of 12 μm. The LCP composite films are laminated with a layer RA copper on each major surface such that the layers of the metal-clad laminate resembles the stack shown in FIG. 2. Lamination is conducted using a predetermined amount of pressure and a predetermined temperature to form the laminate. The specific pressures and temperatures used in the respective lamination processes are shown in Table 6.

The exemplary metal-clad laminates including the LCP composite film are tested in accordance with IPC-4204 and IPC-4204A, the disclosures of which are hereby incorporated by reference in their entireties. Specification Sheet IPC-4202/24, contained therein, is directed to the testing of copper clad liquid crystal polymer.

Table 6 sets forth the in-plane dielectric permittivity (Dk) of the formed metal-clad laminates including the LCP composite film. The in-plane dielectric permittivity (Dk) of metal-clad laminates including the LCP composite film is measured in accordance with the Microstrip Transmission Line method—Extraction from impedance, as set forth in Oliver et al., "Round Robin of High Frequency Test Methods by IPC-D24C Task Group".

TABLE 6 in-plane dielectric permittivity (Dk) of the formed metal-clad laminates

| Example | Lamination Temp (° C.) | Max Lamination Pressure (Psi) | Average Dk MD @10 Ghz | Average Dk TD @10 Ghz | Dk Average @10 Ghz | Dk Ratio (MD/TD) @10 Ghz |
|---|---|---|---|---|---|---|
| 4 - No Lamination | N/A | N/A | 3 | 2.73 | 2.87 | 1.1 |
| 4 | 260 | 343 | 3.35 | 3.27 | 3.31 | 1.02 |
| 4 | 260 | 687 | 3.30 | 3.11 | 3.21 | 1.06 |
| 4 | 270 | 343 | 3.41 | 3.25 | 3.33 | 1.05 |
| 4 | 270 | 687 | 2.93 | 2.88 | 2.91 | 1.02 |
| 4 | 270 | 687 | 3.46 | 3.33 | 3.40 | 1.04 |
| 4 | 280 | 687 | 2.92 | 2.83 | 2.88 | 1.03 |
| 4 | 290 | 687 | 3.24 | 2.99 | 3.12 | 1.08 |
| 5 - No Lamination | N/A | N/A | 3.66 | 2.78 | 3.22 | 1.32 |
| 5 | 270 | 687 | 3.85 | 3.20 | 3.53 | 1.20 |
| 5 | 270 | 687 | 3.57 | 3.45 | 3.51 | 1.03 |

In other embodiments, the ratio of the CTE of the LCP composite film included in the metal-clad laminate in the machine direction relative to the transverse direction (MD/TD) is in the range of 0.4 to 0.7.

The peel strength of the metal-clad laminate may be measured in accordance with IPC-TM-650 2.4.9 peel strength, flexible dielectric materials, the disclosure of which is hereby incorporated by reference in its entirety. In some embodiments, where the metal-clad is MHT copper, the peel strength of the MHT copper from the LCP composite film is in the range of 6.0 to 13.0 lb/in width. In other embodiments, where the metal-clad is MHT copper, the peel strength of the MHT copper from the LCP composite film is in the range of 8.0 to 12.0 lb/in width. In some embodiments, where the metal-clad is RA copper, the peel strength of the RA copper from the LCP composite film is in the range of 4.0 to 10.0 lb/in width. In other embodiments, where the metal-clad is RA copper, the peel strength of the RA copper from the LCP composite film is in the range of 5.0 to 8.0 lb/in width.

FIG. 4 shows XRD analysis results of unlaminated and laminated samples of Example 4 as compared with a sample of commercially available liquid crystal polymer film used in radio frequency circuits ("comparative example"). The sample of comparative example is also laminated with RA copper having a thickness of 12 um. As shown, the unlaminated sample of Example 4 includes a profile in which peaks are provided at 90° and −90°. FIG. 5 shows XRD analysis results of unlaminated and laminated samples of Example 5 as compared with the sample of comparative example. As shown, the unlaminated sample of Example 5 includes a profile in which peaks are provided at 90° and −90°. For the samples of Example 5 laminated at 270° C., these peaks are significantly reduced.

Table 7 sets forth the coefficient of thermal expansion (CTE) of the formed metal-clad laminates including the LCP composite film produced in accordance with Example 4. The CTE is measured in accordance with IPC-TM-650 2.2.4 Dimensional Stability. Specimens of metal-clad laminates including the LCP composite film produced in accordance with Example 4 are tested in accordance with such testing procedures, and the results are set forth in the table.

TABLE 7

| Coefficient of Thermal Expansion | | | | | |
|---|---|---|---|---|---|
| Example | Lamination Temp (° C.) | Max Lamination Pressure (Psi) | CTE MD | CTE TD | CTE Ratio (MD/TD) |
| 4 - No Lamination | N/A | N/A | 5 | 97 | 0.05 |
| 4 | 260 | 343 | | | |
| 4 | 260 | 687 | 28 | 64 | 0.44 |
| 4 | 270 | 343 | 28 | 46 | 0.61 |
| 4 | 270 | 687 | 33 | 46 | 0.72 |
| 4 | 270 | 687 | | | |
| 4 | 280 | 687 | 29 | 45 | 0.64 |
| 4 | 290 | 687 | | | |

Table 8 sets forth the peel strength of metal-clad laminates including the LCP composite film produced in accordance with Examples 1-7, as well as the comparative metal-clad laminates produced using comparative example. Each Example was laminated to make two 11 inch by 7 inch clad. One on 1 oz. MHT copper. One on 1 oz. RA copper. The peel strength is measured in accordance with IPC-TM-650 2.4.9 peel strength, flexible dielectric materials. Specimens of each of the Examples 1-7 are tested in accordance with such testing procedures, and the results are set forth in the table.

TABLE 8

| Peel Strength | | |
|---|---|---|
| Example | Copper | Peel Strength (lb/in width) |
| 1 | MHT | 8.6 |
| 1 | RA | 6.64 |
| 2 | MHT | 11.64 |
| 2 | RA | 10.06 |
| 3 | MHT | 10.88 |
| 3 | RA | 3.43 |
| 4 | MHT | 6.65 |
| 4 | RA | 6.70 |
| 5 | MHT | 10.85 |
| 5 | RA | 4.12 |
| 6 | MHT | 10.09 |
| 6 | RA | 5.76 |
| 7 | MHT | 10.04 |
| 7 | RA | 5.98 |
| comparative example | MHT | 5.44 |
| comparative example | RA | 3.67 |

The results from Table 8 show the improved peel strength of the metal-clad laminates including the LCP composite film produced in accordance with Examples 1-7 as compared to the metal-clad laminates produced using comparative example. The improved adhesion provided by the metal-clad laminates including the LCP composite film allows for the use of RA copper, which is smoother and more difficult to adhere as compared with MHT copper.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A liquid crystal polymer composite film formed from a resin composite, the resin composite comprising:

one or more liquid crystal polymers present in an amount in the range of 40 wt % to 95 wt % based on a total weight of the liquid crystal polymer composite; and one or more porous fillers comprising zeolite having an average pore diameter of 2 nm or less present in an amount in the range of 5 wt % to 60 wt % based on the total weight of the liquid crystal polymer composite;

wherein a thickness of the liquid crystal polymer composite film is in the range of 10 μm-200 μm; and wherein a ratio of an in-plane dielectric permittivity in a machine direction of the liquid crystal polymer composite film to an in-plane dielectric permittivity in a transverse direction of the liquid crystal polymer composite film is in the range of 0.9-1.1 over a frequency range of 1 GHz to 10 GHz.

2. The liquid crystal polymer composite film of claim 1, wherein a ratio of a loss tangent in the machine direction of the liquid crystal polymer composite film to a loss tangent in the transverse direction of the liquid crystal polymer composite film is in the range of 0.2-1.0 over a frequency range of 1 GHz to 10 GHz.

3. The liquid crystal polymer composite film of claim 1, wherein the one or more liquid crystal polymers comprises a polymer including monomer units derived from 4-hydroxybenzoic acid and 6-hydroxy-2-naphthoic acid.

4. The liquid crystal polymer composite film of claim 1, wherein the one or more liquid crystal polymers comprises a polymer including monomer units derived from 4-hydroxybenzoic acid.

5. The liquid crystal polymer composite film of claim 1, wherein the melt viscosity of the resin composite at a melt temperature of 320C and at a shear rate of 1800 (1/s) is at least 30 Pa-s and under 120 Pa-s.

6. The liquid crystal polymer composite film of claim 1, wherein the melt viscosity of the resin composite at a melt temperature of 320° C. and at a shear rate of 1800 (1/s) is at least 36 Pa-s and under 80 Pa-s, wherein the thickness of the liquid crystal polymer composite film is in the range of 10 μm-100 μm.

7. The liquid crystal polymer composite film of claim 1, wherein the melt viscosity of the resin composite at a melt temperature of 320° C. and at a shear rate of 1800 (1/s) is at least 36 Pa-s and under 57 Pa-s, wherein the thickness of the liquid crystal polymer composite film is in the range of 10 μm-100 μm.

8. The liquid crystal polymer composite film of claim 1, wherein the thickness of the liquid crystal polymer composite film is in the range of 25 μm-200 μm.

9. A metal-clad laminate of claim 1 comprising:

the liquid crystal polymer composite film of claim 1; and a metal layer laminated to a major surface of the liquid crystal polymer composite film.

10. The metal-clad laminate of claim 9, wherein the ratio of the in-plane dielectric permittivity in the machine direction of the liquid crystal polymer composite film to the dielectric permittivity in the transverse direction of the liquid crystal polymer composite film provided in the metal-clad laminate is less than the ratio of the in-plane dielectric permittivity in the machine direction of the liquid crystal polymer composite film to the dielectric permittivity in the transverse direction of the liquid crystal polymer composite film prior to lamination.

11. The metal-clad laminate of claim 9, wherein the metal is copper and the copper has a surface roughness of less than 5 microns as measured by Rz Ten point mean roughness.

12. The metal-clad laminate of claim 11, wherein a peel strength of the copper from the LCP composite film is in the range of 6.0 to 13.0 lb/in width.

13. The metal-clad laminate of claim 9, wherein the metal is copper and the copper has a surface roughness of less than or equal to 3 microns as measured by Rz ten point mean roughness.

14. The metal-clad laminate of claim 13, wherein a peel strength of the copper is in the range of 4.0 to 10.0 lb/in width.

15. The metal-clad laminate of claim 9, further comprising an additional metal clad layer laminated to an additional major surface of the liquid crystal polymer composite film.

16. The metal-clad laminate of claim 9, wherein a ratio of a coefficient of thermal expansion of the liquid crystal polymer composite film in the machine direction relative to the transverse direction (MD/TD) is in the range of 0.9 to 1.0.

17. The metal-clad laminate of claim 9, wherein the thickness of the laminate is in the range of 15 μm-50 μm.

18. The metal-clad laminate of claim 9, wherein the thickness of the laminate is in the range of 50 μm-200 μm.

* * * * *